United States Patent

Renfrew et al.

[11] 4,355,012
[45] Oct. 19, 1982

[54] MIXED ANTHRAQUINONEDISULFONIC ACIDS

[75] Inventors: Edgar E. Renfrew, Flemington; Dominic A. Zanella, Lock Haven, both of Pa.

[73] Assignee: American Color & Chemical Corporation, Lock Haven, Pa.

[21] Appl. No.: 20,326

[22] Filed: Mar. 14, 1979

Related U.S. Application Data

[63] Continuation of Ser. No. 919,776, Jun. 28, 1978, abandoned, which is a continuation of Ser. No. 715,636, Aug. 18, 1976, abandoned, which is a continuation-in-part of Ser. No. 612,917, Sep. 12, 1975, abandoned.

[51] Int. Cl.$^3$ .............. C07C 143/36; C07C 143/665
[52] U.S. Cl. .............................. 423/226; 423/573 R; 260/370; 260/372; 260/376
[58] Field of Search .............. 260/370, 372, 376; 423/226, 573

[56] References Cited

U.S. PATENT DOCUMENTS

| | | | |
|---|---|---|---|
| 1,515,325 | 11/1924 | Bailey | 260/369 |
| 1,963,383 | 6/1934 | Rogers | 260/370 |
| 2,997,439 | 8/1961 | Nicklin et al. | 423/226 |
| 3,032,560 | 5/1962 | Dawsey | 260/369 |
| 3,459,495 | 8/1969 | Lida et al. | 423/571 A X |
| 3,642,448 | 2/1972 | Beavon | 423/223 X |

FOREIGN PATENT DOCUMENTS 150000 8/1973 Czechoslovakia .

OTHER PUBLICATIONS

Chem. Abstract Index-Jan–Jun 1974-col. 3.
Horyha et al., "Sulfonates of Cyclic Carboxylic Acids", in Chemical Abstracts, vol. 80, 1974, 47649k.

Primary Examiner—Charles F. Warren
Assistant Examiner—Raymond Covington
Attorney, Agent, or Firm—Armstrong, Nikaido, Marmelstein & Kubovcik

[57] ABSTRACT

Mixed disulfoanthraquinonemono-, di-, or polycarboxylic acids produced by the direct sulfonation of an anthraquinone of the formula:

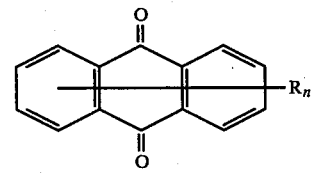

wherein n is an integer of 1–4 and each R is independently selected from alkyl of 1–4 carbon atoms and chlorine with at least one R being alkyl and with the proviso that substitution in a single ring is limited to mono, di- or tri-substitution and substitution in two rings is limited to mono or di-substitution in each ring.

The mixed disulfoanthraquinonemono-, di-, or polycarboxylic acids have exceptional utility in the Stretford Process.

6 Claims, No Drawings

MIXED ANTHRAQUINONEDISULFONIC ACIDS

This is a continuation of application Ser. No. 919,776 filed June 28, 1978, which is a continuation of application Ser. No. 715,636 filed Aug. 18, 1976, which, in turn, is a continuation-in-part of application Ser. No. 612,917 filed Sept. 12, 1975. Each of the prior applications is now abandoned.

BACKGROUND OF THE INVENTION

1. Field of the Invention

The present invention relates to mixtures of disulfonated anthraquinones and more specifically to mixtures of disulfonated anthraquinones having high solubility and utility in the Stretford Process, which is defined below.

2. Description of the Prior Art

Anthraquinonedisulfonic acids in addition to their use as precursors in the dye industry, are employed in the well-known Stretford Process. The Stretford Process is a liquid purification process for the removal of hydrogen sulfide from gas streams and liquid hydrocarbons. In the Stretford Process a hydrogen sulfide containing fluid such as a stream of pretroleum or coal gas is intimately contacted with an aqueous alkaline solution of salts of one or several anthraquinonedisulfonic acids and of vanadium salts, e.g., sodium meta vanadate. The hydrogen sulfide is oxidized, liberating elemental sulfur which separates and is filtered off. The anthraquinonedisulfonic acids function as hydrogen acceptors which are capable of being easily regenerated for reuse without significant loss. The regeneration is carried out in a separate operation by oxidation with air.

Many water-soluble anthraquinonedisulfonic acids will function as hydrogen acceptors in the aqueous system of the Stretford Process. For practical reasons, however, anthraquinonedisulfonic acids having high solubility in the process and which are not sensitive to the "salting-out" effect of the inorganic cations present in the process are preferred since smaller absorbtion units can, by using more concentrated solutions, provide superior and more economical performance. It is also preferred that the anthraquinonedisulfonic acids react rapidly in the acceptor step and the regeneration step.

Certain anthraquinonedisulfonic acids have been found to perform well in the Stretford Process. Of especial value are 2,7-anthraquinonedisulfonic acid, 1,6-anthraquinonedisulfonic acid and 1,7-anthraquinonedisulfonic acid.

The methods previously known by which these anthraquinonedisulfonic acids are produced, however, suffer serious disadvantages. If anthraquinone is disulfonated in the absence of mercury or its ions, a mixture of 2,6- and 2,7-anthraquinonedisulfonic acid is obtained. The 2,7-isomer is reasonably useful as a Stretford desulfurizing material, being sufficiently water soluble and being capable of fairly fast regeneration. The 2,6-isomer, however, is relatively insoluble in the system normally used in the Stretford Process, and only comparatively small amounts can be tolerated in units of efficient design. Since the isomers are formed in relatively equal amounts when anthraquinone is disulfonated, unless a use exits for the the 2,6-isomer, the synthesis and separation of the 2,7-isomer is not economically attractive. Thus, the ready availability of the 2,7-isomer is directly dependent on the commercial demand for the 2,6-isomer and the price of the 2,7- becomes unacceptably high if the market for the 2,6- is poor.

Other methods suitable for producing anthraquinonedisulfonic acids having utility in the Stretford Process require the use of mercury or certain of its salts. Procedures based on such technology, however, must have a mercury-removing step for the products and the effluent from the processes will contain intolerable amounts of derivatives of this dangerous element. The techniques by which mercury can be removed are not well developed and efficient, and would not be economical even if they were available due to the high capital investment required to build the large and complicated equipment.

SUMMARY OF THE INVENTION

According to the present invention, mixtures of disulfoanthraquinonemono-, di-, or polycarboxylic acids having outstanding utility in the Stretford Process are produced by the direct sulfonation and concomittant or subsequent alkyl oxidation of an anthraquinone of the formula:

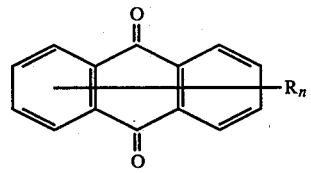

wherein n is an integer of 1–4 and each R is independently selected from alkyl of 1–4 carbon atoms and chlorine, at least one R being alkyl, with the proviso that substitution in a single ring is limited to mono-, di- or trisubstitution and substitution in two rings is limited to mono-, or di-substitution in each ring.

The mixtures of disulfoanthraquinonecarboxylic acids according to the present invention have exceptional solubility evey by the demanding standards established for the Stretford Process and do not require a costly separation step. Furthermore, the direct sulfonation procedure does not require the use of mercury or its compounds and the objectionable discharge of these compounds to the environment is avoided.

DETAILED DESCRIPTION

Anthraquinones useful in producing the mixtures of disulfoanthraquinonecarboxylic acids according to the present invention are those of the structural formula:

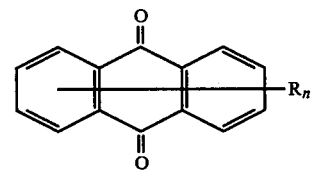

wherein R and n are as defined above. As employed herein "alkyl" is intended to include straight and branched chain alkyl of 1–4 carbon atoms.

As examples of anthraquinone starting materials of the foregoing formula which yield useful disulfonic acids and salts there may be mentioned:
1-methylanthraquinone
2-methylanthraquinone
1-ethylanthraquinone 2-ethylanthraquinone
2-n-propylanthraquinone
2-isopropylanthraquinone
1-t-butylanthraquinone
2-n-butylanthraquinone
2-isobutylanthraquinone
2-sec-butylanthraquinone
2-t-butylanthraquinone
1-t-butylaminoanthraquinone
1,2-dimethylanthraquinone
1,3-dimethylanthraquinone
1,4-dimethylanthraquinone
1,2,4-trimethylanthraquinone
1,3-diethylanthraquinone
1-methyl-4-isopropylanthraquinone
2,6-dimethylanthraquinone
2,7-dimethylanthraquinone
2,3,6-trimethylanthraquinone
1,4,6-trimethylanthraquinone
1,3,6-trimethylanthraquinone
1,3,5,7-tetramethylanthraquinone
1,3,6,8-tetramethylanthraquinone
1-chloro-3-methylanthraquinone
2-chloro-7-methylanthraquinone
2-chloro-3-methylanthraquinone
1-chloro-2-methylanthraquinone
2-chloro-6-methylanthraquinone The alkylanthraquinones and alkylchloroanthraquinones easily available from the Friedel-Crafts reaction with phthalic anhydride followed by ring closure are preferred. These include, for example: 2-methylanthraquinone; 2-ethylanthraquinone; 2,3-dimethylanthraquinone; and 1,2-dimethylanthraquinone. The anthraquinones may be employed alone or in mixtures in the direct sulfonation.

The direct disulfonation of the anthraquinones according to the present invention may be carried out under conditions which are well-known in the disulfonation of anthraquinones. Thus, for example, conditions such as those described in Wuertz, U.S. Pat. No. 2,074,309 and Rogers, U.S. Pat. No. 1,963,383 may be employed. It is to be noted that Rogers at page 2, lines 17–46, suggests that his method may be employed in the treatment of alkylanthraquinones. There is no disclosure, however, of specific alkylanthraquinones which may be disulfonated according to Roger's procedures nor is there any disclosure or suggestion that the reaction product of such a disulfonation may be employed in a gas purification process.

It has been reported by Locher and Fierz, (Helv. Chim. Acta 10 642 (1927) that attempts to bring about the direct sulfonation of 2-methylanthraquinone were not successful (see also Suter, C. M., *Organic Chemistry of Sulfur*, page 306, John Wiley and Sons, Inc., NYC, 1944). Lauer, J. Prakt Chem. [2] 130 185 (1931) reports that sulfonation in 120% of the theoretical amount of sulfur trioxide as 40% oleum at 150° results in about 30% of the 3,7- and 38% of the 3,6-disulfonic acids. (Suter, also cites Lauer, loc cit.).

Typically, disulfonation of the anthraquinone materials of the invention is carried out according to the invention employing an excess of fuming sulfuric acid containing from 30 to 50% sulfur trioxide at 140° to 170° C. until disulfonation is complete. An alkali metal sulfate, e.g., sodium sulfate, may be added to the disulfonation system for the purpose of minimizing oxidation of the anthraquinone nucleus. The disulfonic acids are separated from the reaction mass by neutralization of the sulfonating mass after dilution and eventual evaporation since the material is so extraordinarily soluble that conventional salting out procedures are ineffectual.

Contrary to the statements and implications of the two references (Locher et al and Lauer) it has been determined according to the present invention that disulfonation of 2-methylanthraquinone in 50% oleum at 150° C. for four hours yields an extraordinarily water soluble material which has little, if any, methyl remaining. Oxidation has occurred under the conditions of the reaction, and carboxylic groups have been produced from the methyls. The resultant product, when isolated from the sulfonating medium, is extremely soluble in water, and shows excellent activity in the Stretford Process.

As employed herein the "Stretford Process" is intended to include any of the known embodiments of the process for removing hydrogen sulfide from fluids, e.g., petroleum or coal gas mixtures or liquid hydrocarbons, wherein the fluids are contacted with an alkaline solution of one or more anthraquinonedisulfonic acids and, typically, of vanadium salts whereby the hydrogen sulfide is oxidized and sulfur is liberated and the reduced anthraquinonedisulfonic acid or acids is or are reoxidized by means of an oxygen containing gas. The Stretford Process is described in more detail in the publication "Removal of Hydrogen Sulphide from Coke Oven Gas by the Stretford Process" by T. Nicklin and B. H. Holland presented at the European Symposium "Cleaning of Coke Oven Gas", Starbrücken, March 21 and 22, 1963, available through the North Western Gas Board (pages 2–8); U.S. Pat. No. 3,035,889 (Column 1, line 23 to Column 2, line 52); U.S. Pat. No. 2,997,439 (Column 1, line 17 to Column 2, line 18) and British Pat. No. 878,251; the disclosures of these references being incorporated herein by reference.

The disulfoanthraquinonemono-, di- or polycarboxylic acids according to the present invention, because of their extreme solubility in water, may be employed as the anthraquinonedisulfonic acids in the Stretford Process in place of or in conjunction with the anthraquinonedisulfonic acids heretofore employed and may be used in much higher concentrations. The use of the higher concentrations results in smaller capital expenditures and lower operating costs.

The products of the treatment of alkylanthraquinones as above by the methods of the invention are complex mixtures bearing both sulfonic acid and carboxylic acid groups. Complete identification and structure assignment has not yet been possible.

Certain derivatives of the products can be advantageously examined by analytical techniques (infrared spectroscopy, nuclear magnetic resonance spectroscopy, and elemental analysis) to establish the general structures.

The disulfonic acid made from 2-methylanthraquinone by the method of Example I was converted by the Fischer chlorination method, in which the sulfo groups were replaced with chlorine atoms, by heating for an extended period of time in aqueous medium in the presence of hydrochloric acid and sodium chlorate. The method is similar to that described for the preparation of 2,7-dichloroanthraquinone from 2,7-anthraquinonedisulfonic acid by Schmidt, Bull, soc. ind. Mulhouse 84 409 (1914) (as reported in Elsevier's Encyclopedia of Organic Chemistry 13, 424, Elsevier Publishing Co., NYC, Amsterdam, 1946); by Lauer, J. pr.

Chem. 2 130 185 (1931); and by Jones and Mason, J. Chem. Soc. 1934 1813.

The chlorinated material so produced showed 20.2% chlorine and 0.0% sulfur on analysis; the formula for dichloroanthraquinonemonocarboxylic acid, $C_{15}H_7Cl_2O_4$ requires 22.0% chlorine, 0.0% sulfur.

Examination of this derivative by infrared spectroscopy (IR) and protonmagnetic resonance (NMR) showed the following characteristic of the nature of the product of Example I: The NMR spectra obtained in dimethyl sulfoxide $d_6$ solutions showed no remaining methyl group. The IR spectra indicated absorptions characteristic of anthraquinone and of carboxylic acid groups.

Passage of the chloroanthraquinone carboxylic acid (produced by the Fischer chlorination of the product of Example I) through a gas chromatograph (6 ft. × ⅛ in., 3% OV-17 column, programmed from 175° C. to 300° C. at 5% min.) showed seven volatile components, in amounts as follows: 41.9, 21.9, 10.0, 9.7, 7.4, 5.2 and 4.0%.

The exact nature of the original structures is thus not known. However, since anthraquinone itself under similar sulfonation conditions gives predominantly a mixture of the 2,6 and 2,7 isomers, it is reasonable to assume that the major components from Example I are also "non-peri" isomers (the peri positions are 1,4,5, and 8), i.e., 3,6-disulfoanthraquinone-2-carboxylic acid and 3,7-disulfoanthraquinone-2-carboxylic acid. Reasoning from the fact that 2-methylanthraquinone nitrates first in the 1-position in sulfuric acid, it is not unlikely that the next two isomers in quantity are 1,6-disulfoanthraquinone-2-carboxylic acid and 1,7-disulfoanthraquinone-2-carboxylic acid. Other isomers can be any of the peri products, in which the sulfo groups are 1,5; 1,8; 4,5 or 4,8. Monosulfonated materials and decarboxylated derivatives are somewhat remote possibilities.

The invention is further illustrated by the following examples:

EXAMPLE I

To a 1000 ml. 4-necked flask equipped with a stirrer, heater, thermometer and drying tube there was added 500 g fuming sulfuric acid (50% by weight free $SO_3$) at 60° C. and 200 g. 2-methylanthraquinone. The charge was stirred one hour, after which was added 50 g. sodium sulfate. The temperature was raised over three hours to 150° C., and the mixture was stirred at 150°–155° C. for four more hours, after which it was allowed to cool to room temperature. The charge was drowned cautiously into 2000 ml. water at 50° C., with external cooling to control the exotherm. The temperature was then adjusted to 80° C. and to the stirred mass was carefully added 400 g. calcium carbonate until the solution was no longer acid to Congo Red test papers. The mass was filtered and the cake was washed with water. Weight cake, 621 g. The filtrate was spray-dried. Weight, 391.

EXAMPLE II

In a manner similar to Example I, 236 g. 1,3-dimethylanthraquinone was disulfonated using 550 g. 50% oleum. The mixture was drowned into 2200 ml. water, and the neutralization was effected with about 440 g. calcium carbonate. The spray-dried filtrate weighed 440 g.

EXAMPLE III

In the manner of Example I, 212 g. 2-ethylanthraquinone was disulfonated.

EXAMPLE IV

In the manner of Example I, 2,3-dimethylanthraquinone was disulfonated.

EXAMPLE V

In the exact manner of Example I 200 g. 2-methylanthraquinone was disulfonated. After cooling to room temperature the charge was carefully drowned into 4000 ml. water at 50° C., with external cooling to control the exotherm. Then beginning at 40° C. the mass was neutralized to slight alkalinity to Brilliant Yellow Papers with a slurry of calcium-hydroxide prepared from 1090 ml. water and 254 g. calcium oxide. After neutralization the mixture was heated to 80° C. and filtered. The cake was washed with warm water. The cake was dried. Weight of cake, 640 g. The filtrate was treated with 60 g. soda ash to convert the dicalcium salt to the disodium salt. After heating to 90° C., the mixture was clarified to remove the calcium carbonate.

What is claimed is:

1. A mixture of disulfoanthraquinonecarboxylic acids suitable for use in the Stretford Process and which is the reaction product of the direct sulfonation of an anthraquinone of the formula:

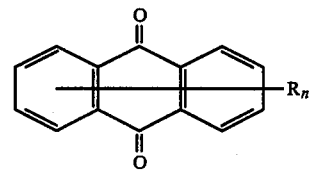

wherein n is an integer of 1–4 and each R is independently selected from alkyl of 1–4 carbon atoms and chloro, at least one R being alkyl, with the proviso that substitution in a single ring is limited to mono-, di- or trisubstitution and substitution in two rings is limited to mono- or di-substitution in each ring.

2. The mixture of disulfoanthraquinonecarboxylic acids of claim 1 wherein sulfonation is carried out with sulfuric acid containing 30% to 50% sulfur trioxide at a temperature of from 140° to 170° C.

3. The mixture of disulfoanthraquinonecarboxylic acids of claim 1 wherein the anthraquinone that is sulfonated and oxidized is 2-methylanthraquinone.

4. In the Stretford Process wherein a gas containing hydrogen sulfide is contacted with an aqueous alkaline solution of salts of anthraquinone disulfonic acids and of vanadium to oxidize the hydrogen sulfide to form sulfur which is thereafter removed from said solution by filtration and the solution regenerated, the improvement comprising employing in said aqueous alkaline solution, salts of a mixture of disulfoanthraquinonecarboxylic acids prepared by the direct sulfonation of an anthraquinone of the formula

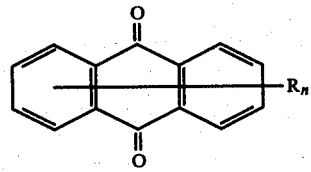

wherein n is an integer of 1–4 and each R is independently selected from alkyl of 1–4 carbon atoms and chloro, at least one R being alkyl, with the proviso that substitution in a single ring is limited to mono-, di- or trisubstitution and substitution in two rings is limited to mono- or di-substitution in each ring.

5. The process of claim 4 wherein sulfonation is carried out with sulfuric acid containing 30% to 50% sulfur trioxide at a temperature of from 140° to 170° C.

6. The proess of claim 4 wherein the anthraquinone that is sulfonated and oxidized is 2-methylanthraquinone.

* * * * *